Oct. 9, 1962
G. HILGERS
3,057,708
METHOD FOR THE THERMAL PROCESSING OF CARBON-CONTAINING GAS BY DIRECT HEAT EXCHANGE WITH ANOTHER GAS
Filed Nov. 6, 1958
2 Sheets-Sheet 1
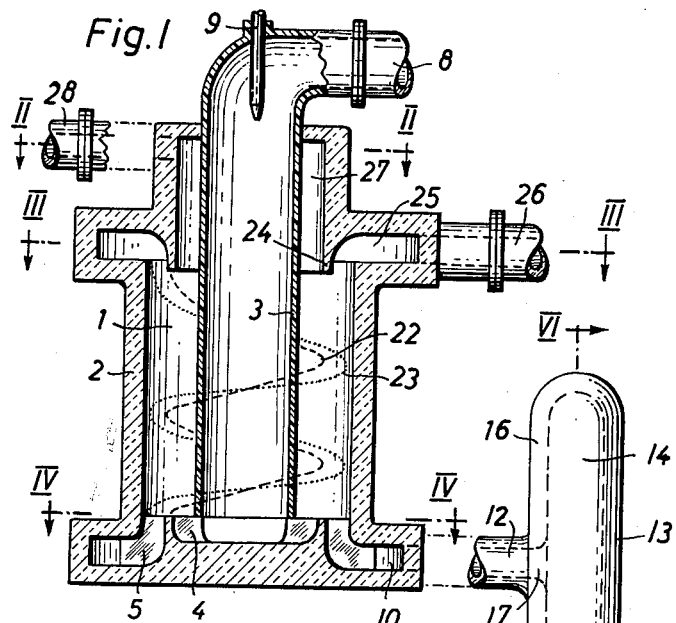
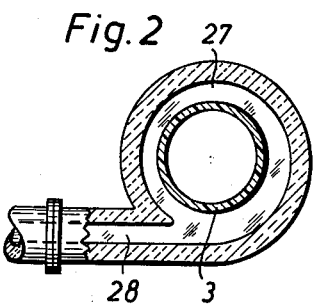
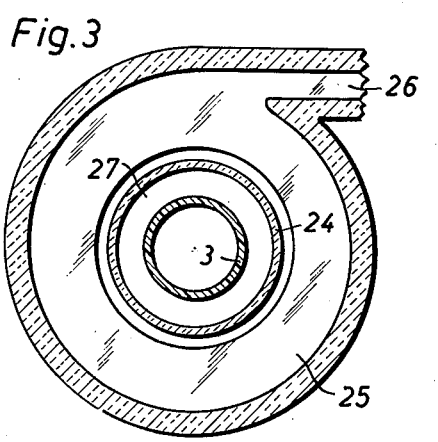
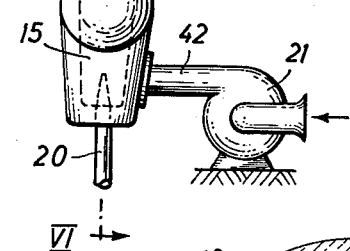
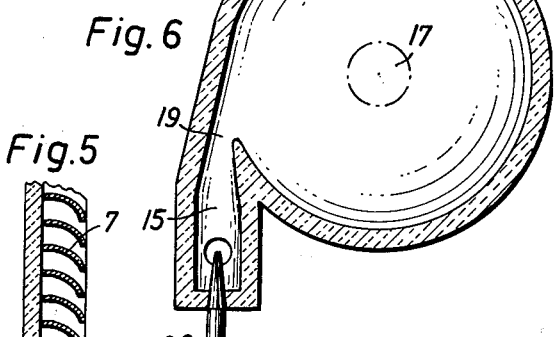
INVENTOR
Giovanni Hilgers Oct. 9, 1962 G. HILGERS 3,057,708
METHOD FOR THE THERMAL PROCESSING OF CARBON-CONTAINING
GAS BY DIRECT HEAT EXCHANGE WITH ANOTHER GAS
Filed Nov. 6, 1958 2 Sheets-Sheet 2
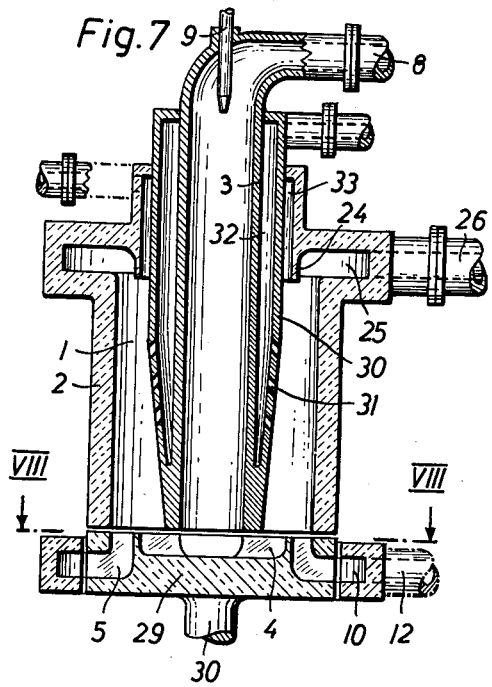
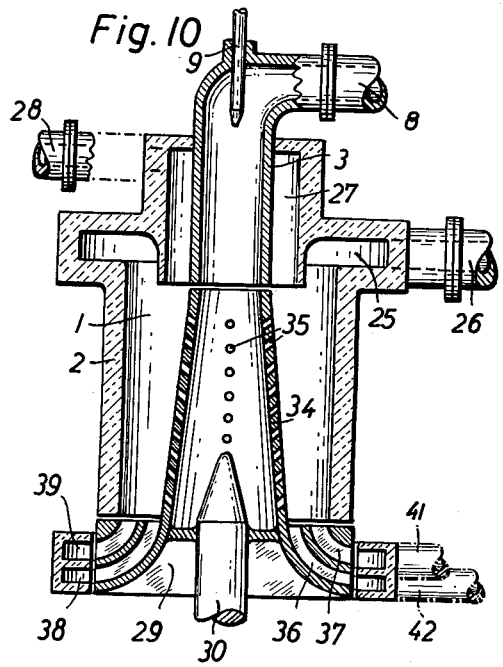
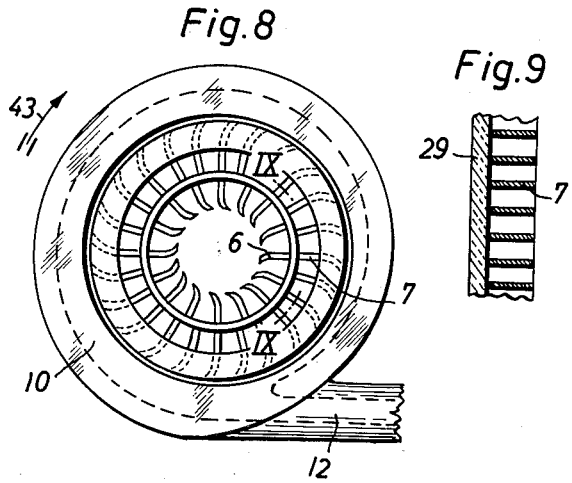
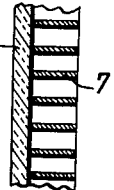
INVENTOR
Giovanni Hilgers United States Patent Office 3,057,708
Patented Oct. 9, 1962

3,057,708
METHOD FOR THE THERMAL PROCESSING OF CARBON-CONTAINING GAS BY DIRECT HEAT EXCHANGE WITH ANOTHER GAS
Giovanni Hilgers, Post Bechen uber Bergisch-Gladbach, Germany
Filed Nov. 6, 1958, Ser. No. 772,291
6 Claims. (Cl. 48—206)

My invention relates to methods and means for the thermal processing of gaseous or gas-entrained substance by heat exchange with a gaseous heat carrier, and more particularly to the thermal processing of carbon-containing gaseous substance, such as the gasifying of coal dust entrained in gas, the cracking of liquid hydrocarbons dispersed in gas, the cracking of gaseous or vaporous hydrocarbons, or combinations of such processes. In a more particular and preferred aspect my invention concerns itself with the production of fuel gas by gasifying finely distributed solid and/or liquid fuel substances or by thermal conversion of gaseous fuel substance.

In many chemical processes, including those mentioned, the heat exchange between gases must occur at highest possible temperatures for obtaining short reaction periods or for approaching the asymptote of a desired conversion, for example. However, the temperature-dependent strength of most structural materials applicable for gas-to-gas heat exchangers imposes a natural limitation upon the safe maximum temperature applicable for such purposes. For example, even radiation recuperators do not permit heating the gas to be processed at temperatures higher than 900° C. regardless of whether the heat-transmitting walls are metallic or ceramic. The temperature limit is still lower if the gas is apt to react with the wall material.

All gasifying or cracking operations of carbonaceous substance, however, require high processing temperatures or make high temperatures desirable in order to permit reducing the necessary reaction periods. Particularly for the cracking of hydrocarbons it is important to have the cracking process occur in spaces of high wall temperatures. During cracking, there evolve carbon skeletons which must be converted with $CO_2$ or $H_2O$ to CO. The solid constituents within the gas are supposed to rapidly assume a highest possible temperature. Since the heat absorption of solids during heat exchange by radiation is greater than that of gases, the solid constituents contained in the gas are preferentially heated in the range of high wall temperatures so that the carbon or carbonaceous constituents dispersed in the gas may assume higher temperatures than the gas itself. This reduces the reaction periods required for converting the carbon constituents to CO. Indeed, in some cases, a reaction of this kind is made feasible or economical only in the range of the relatively low median gas temperatures at which the cracking of carbon-containing substances usually takes place.

It is an object of my invention to devise a way of exchanging heat in continuous operation from one gas to a second gas and particularly to liquid or solid constituents dispersed in the second gas, at any desired temperature, without requiring the use of metallic or ceramic heat-transmitting structure between the two gases.

Another object is to devise an industrially applicable fuel gas generator of improved thermal efficiency.

To achieve these objects, and in accordance with one of the features of my invention, I form two circulating and axially progressing currents of the respective gases, one current within the other and in direct heat-transferring relation thereto, within a vessel space serving mainly to contain the two circulating and axially progressing gas currents without separating them from each other.

According to another feature of the invention, the above-mentioned vessel space is ring-shaped and is formed by an inner core structure and an outer wall structure both of circular cross section.

This method is based upon the phenomenon that gases rotating at the same angular velocity about a common axis diffuse into and thus mix with each other only to a slight extent or require for such mixing a relatively long period of time. The slightest amount of diffusion per time unit is obtained if not only the angular velocities of the respective gas groups are equal but if also the respective axial velocities are unidirectional and of equal magnitude.

For performing this method and in accordance with anoother feature of my invention, I provide a heat-exchanging device which has a vessel of circular cross section in whose one axial end portion two or more concentrically arranged systems of inclined nozzles or annular nozzle openings are located. I further provide means for introducing into these nozzle systems respective flows of gases at velocities as required for the above-mentioned conditions, and I provide at the other axial end of the vessel corresponding gas-outlet ducts.

Under the above-mentioned conditions and up to a certain axial length of the vessel space, the circulating currents of gas remain practically separate from each other so that the outlet ducts permit discharging the respective gases practically in unmixed condition. If under such conditions the gases have respectively different temperatures, heat is transferred from one to the other gas. Any partitions separating the gases from each other are not required, and the direct heat transfer can be effected at any desired temperature.

Now, if carbon dust, oil mist or oil vapor is admixed to one of the gas currents (carrier gas) and if the other gas is used as a heating agent by having it chemically and exothermically react wih a portion of the substances admixed to the carrier gas, or by introducing it into the vessel space at a sufficiently high temperature, then the desired chemical conversion is effected in the carrier gas by the heat radiation from the heating gas and/or by the vessel walls heated by the heating gas. Another way of operation is to cause combustion of a gas mixture in the interior of the cylindrical vessel.

The invention will be further understood from the following description of the embodiments of processing devices according to the invention illustrated by way of example on the accompanying drawing, in which:

FIG. 1 shows, partly in section, a fuel-gas producer operating by gasifying coal dust or cracking hydrocarbons, FIG. 2 is a cross section along the line II—II in FIG. 1, FIG. 3 is a cross section along the line III—III in FIG. 1, FIG. 4 is a cross section along the line IV—IV in FIG. 1, FIG. 5 is a cross section along the line V—V in FIG. 4, and FIG. 6 is a cross section along the line VI—VI in FIG. 1.

FIG. 7 is an axial section of a modified device for gasifying coal dust or cracking hydrocarbons, FIG. 8 is a cross section along the line VIII—VIII in FIG. 7, FIG. 9 is a section along the line IX—IX in FIG. 8.

FIG. 10 is an axial section through another device also suitable for gasifying coal dust or cracking hydrocarbons.

The device illustrated in FIGS. 1 to 6 comprises a ring-shaped reaction chamber 1 within a cylindrical vessel 2 of refractory metal or ceramic which is preferably provided with a heat-insulating jacket (not illustrated). The core of the reaction chamber 1 is formed by an inner cylinder 3 also consisting of refractory material. The bottom of the reaction chamber is provided with two circular and concentric groups of nozzles 4 and 5. As apparent from FIGS. 4 and 5, the individual nozzles of each group are formed by guide vanes 6 or 7 of refractory material which, seen from above (FIG. 4), extend approximately radially to the vessel axis and which, seen from the side (FIG. 5), are all curved in one direction.

Connected to the top of the inner cylinder 3 is a supply conduit 8 for carrier gas or for a gasifying agent such as steam. A nozzle 9 for injecting oil protrudes from above into the inner cylinder. However, in lieu of nozzle 9 a supply pipe for coal dust may communicate with the inner cylinder 3 and may be connected to a coal-dust bin through a lock such as a cell wheel.

The inner cylinder 3 supplies the mixture of carrier gas and oil or carrier gas and pulverized coal to the inner nozzle group 4. The outer nozzle group 5 is supplied with gaseous medium through a ring channel 10 which surrounds the nozzle group 5 and whose outer wall 11, seen from above (FIG. 4), is preferably spiral shaped. An insulated gas pipe 12 of refractory material opens into the ring channel 10, preferably in tangential relation thereto, and connects channel 10 with a burner 13 which is of the cyclone or vortex type in order to obtain a complete combustion without excess of air. However, in cases where it is desired to produce combustion gases with some excess of air, any suitable other type of burner or combustion chamber may be used. The cyclone burner 13 comprises a vortex space 14 and a combustion space 15. The vortex space is formed by a narrow chamber of circular cross section with an outlet opening 17 in the center of one side wall 16 through which combustion gases produced pass into the above-mentioned gas pipe 12. A nozzle 19 opens approximately tangentially into the ring-shaped wall 18 (FIG. 6) of vortex space 14 and merges directly with the combustion space 15.

A suitable fuel, for example oil, coal dust or a combustible gas is blown into the combustion space 15 by means of a pet nozzle 20. The combustion space 15 is further supplied with air through a blower 21 and a connecting conduit 42. During operation, the fuel burns partly in the combustion space 15 and partly in the vortex space 14. The evolving hot gases of comubstion pass through the outlet pipe 12 and the ring channel 10 to the outer nozzle group 5 to serve as the heating gas in the processing device proper. If particularly high temperatures of the heating gas are required, the air supplied to blower 21 is not taken cold from the ambient atmosphere but is first preheated in a heat exchanger (not shown).

The guide vanes 6 and 7 of respective nozzle groups 4 and 5 are so curved that the heating gas and the mixture of carrier gas and oil or coal dust issuing from the nozzles enter into the reaction chamber 1 at substantially the same angular velocity. The pressures of the respective two gas flows are preferably so adjusted that the axial velocities of both are also approximately equal. The two gas vortexes then travel upwardly through the reaction chamber 1 on two substantially parallel, helical paths. This is schematically indicated in FIG. 1 by helical lines 22 and 23. Line 23 corresponds to the travel path of a gas particle introduced through a nozzle of group 5 and moving upwardly along the inner wall side of vessel 2. Line 22 corresponds to the path of a particle located approximately at the boundary between the two eddy currents of the respective gases flowing upwardly. The two lines 22 and 23, therefore, identify the approximate boundaries of the space within which the heating gas entering through the nozzle group 5 passes upwardly, whereas the line 22 and the inner cylinder 3 define the approximate boundaries of the space in which the carrier gas and the substance entrained thereby flow from nozzle group 4 helically in the upward direction.

Since the angular speed and direction of the two media are equal, no appreciable diffusion occurs during the passage of the media through the reaction chamber. During such passage, heat is continuously radiated inwardly from the heating gas entering through the nozzles 5. The wall of vessel 2 is likewise heated by the heating gas to a very high temperature and hence radiates heat inwardly. Both effects provide the heat necessary for cracking or gasification of the oil or coal dust entrained in the carrier medium issuing from nozzles 4.

A cylindrical wall 24 protrudes from above into the reaction chamber 1 and coaxially surrounds the inner cylinder 3 with sufficient clearance to form an annular channel 25. The cylindrical wall 24 separates the vortex current of the heating gas from the current of the useful gas produced by gasification or cracking. The vessel 2 of the reaction chamber is widened about the wall 24 to form a ring-shaped outlet channel 25 from which a conduit 26 (FIG. 3) is branched off, preferably tangentially, for discharging the heating gas. The annular channel 27 between wall 24 (FIG. 2) and the inner cylinder 3 serves for discharging the produced useful gas and communicates with a gas-exit conduit 28 extending preferably tangentially.

With a relatively great axial height of the reaction chamber 1 some amount of diffusion of the two gas flows along the imaginary boundary face is inevitable so that an upwardly widening diffusion zone of annular shape will exist between the two helical gas flows. For catching and separating the gas quantity contained in the diffusion zone, another ring-shaped exit channel may be provided between the annular exit channels 25 and 27. In such case, however, it should be considered that the imaginary boundary face between the two helical eddy currents of gas is not necessarily parallel to the wall of vessel 2 or to the inner cylinder 3 but may define therewith an angle whose size depends upon the expansion of the one medium or the contraction of the other in the reaction zone. This can be equalized by giving the vessel 2 and the inner cylinder 3 of the reaction chamber a shape departing from a straight cylinder and tapering conically in the upward or downward direction depending upon the particular conditions.

The heat required for gasifying coal dust or cracking hydrocarbons may also be produced within the reaction chamber itself by combusion of fuel substance. This is preferably effected by introducing through the outer nozzle group 5 the air required for the combustion, and providing in the wall of vessel 2 closely above the nozzle openings of group 5 a number of nozzles for ejecting the fuel to be burned. Such fuel nozzles are preferably directed tangentially with respect to the vessel 2.

Another way of operating the device is to supply the heating gas through the inner cylinder 3 and the inner nozzle group 4, while supplying the carrier gas mixed with oil or coal dust through the ring channel 10 of nozzle group 5, so that the helical paths of the respective media in the reaction chamber are mutually exchanged, in comparison with the operation first described.

The fuel-gas producer illustrated in FIGS. 7 to 9 is particularly designed to minimize or prevent diffusion of the two media in reaction chamber 1. Fundamentally, the design of the device is similar to that described above with reference to FIGS. 1 to 6 so that it will suffice to explain the distinctive features of the modified embodiment, the same reference numerals being used for the two embodiments relative to similar components respectively.

According to FIG. 7, the bottom of the reaction chamber 1 together with the two ring-shaped nozzle groups 4 and 5, consists of a disc 29 which, during operation of the device, is kept in rotation in the direction of the arrow 43 (FIG. 8) by means of a drive shaft 30. The periphery of the rotating disc 29 is closely surrounded by the stationary ring channel 10. The outer nozzle group 5 extends from the periphery of disc 29 to the top surface facing the interior of the reaction chamber 1. At the nozzle inlet near the periphery, the guide vanes 6 or 7 of the nozzle groups are preferably curved forwardly with respect to the direction of disc rotation (FIG. 8). This facilitates passing or scooping the particular medium into the correlated nozzle group. Seen from the side, that is in vertical section (FIG. 9), the guide vanes may have straight shape. Such straight shape is well applicable because in thet device of FIGS. 7 to 9 the media entering into the nozzles receive their rotational velocity by virtue of the rotation of disc 29. As a result, the two helical gas currents issuing from the respective nozzle groups 4 and 5 are reliably kept at the same angular velocity corresponding to the rotational speed of the disc 29. As a result, the diffusion of the two media is particularly slight.

In the device according to FIGS. 7 to 9, the inner cylinder 3 is surrounded by a concentric jacket 30 whose upper portion is cylindrical and whose lower portion tapers conically downward. The lower end of jacket 30 merges with the inner cylinder 3. The conical portion of jacket 30 is provided with perforations 31 through which a portion of the useful gases being produced is gradually drawn off and is discharged through an annular channel 32 between jacket 30 and inner cylinder 3. This also reduces diffusion of the two media in the reaction chamber. The remainder of the useful gases being produced is drawn off through a ring space 33 between the upper portion of jacket 30 and the cylindrical wall 24.

If, despite the above-mentioned means and expedients, some diffusion of the gases is found to occur within a narrow diffusion zone, the mixed gases are preferably withdrawn from that zone through the ring space 33, so that pure output gas and heating gas is obtained from channels 32 and 25 respectively.

The device illustrated in FIGS. 7 to 9 may also be operated by introducing the heating gas or hot gases of combustion through the inner cylinder 3 and inner nozzle group 4, while introducing the carrier medium with the substances to be gasified or cracked through the outer nozzle group 5. The hot gases of combustion are then drawn off through the perforations 31 of jacket 30. This greatly increases the heating of the jacket so that a particularly good heat radiation is obtained.

It is further possible to provide the wall of vessel 2 with openings and to draw one medium through these openings.

The device illustrated in FIG. 10 is so designed that three media can be supplied at respectively different locations. Suitable as such media, for example, are two gases and an oil mist, oil vapor or a carrier gas laden with coal dust.

In this device, the lower end of the inner cylinder 3 is upwardly spaced a relatively great distance from the top of disc 29 which forms the bottom of the reaction chamber 1. A hollow frusto-conical structure 34 forms the core of the reaction chamber 1 and is mounted on top of disc 29. The upper end of structure 34 is close to the inner cylinder 3 and has a diameter substantially equal to that of the inner cylinder. The wall of the tubular structure 34 has a number of perforations 35. Two ring-shaped groups of nozzles 36 and 37 are provided in the rotatable disc 29 outside of structure 34 and in concentric relation thereto. The nozzles 36 and 37 extend from the periphery to the top surface of disc 29 within the reaction chamber 1 and are curved in such a manner that one group lies above the other at the periphery of the disc but one beside the other at the top surface. The periphery of disc 29 is surrounded by two ring channels 38 and 39 located one above the other and each provided with a tangential inlet conduit 1 or 2 through which the two media are supplied to respective nozzle groups 36 and 37.

One way of operating the device of FIG. 10 is to introduce hot combustion gases through the outer nozzle group 37 to serve as heating gases, while introducing oil mist, oil vapor or coal dust through the inner nozzle group 36. A gasifying agent such as steam is then supplied through the inner cylinder 3 to the tubular structure 34. The gasifying agent gradually passes through the perforations 35 into the reaction chamber. This takes place, due to the rotation of disc 29 and structure 34, at an angular velocity equal to that of the two media passing into the reaction chamber from nozzle groups 36 and 37. The evolving useful gases are drawn off through the ring space 27, and the heating gases are discharged through the exit space 25.

The various media may also be introduced at other locations. For example, the oil mist or coal dust may be supplied through the perforations 35 and the gasifying agent through the nozzle group 36. Furthermore, the wall of vessel 2 may be provided with openings through which a medium can be introduced.

It is further possible to dispose the nozzle groups 36 and 37 in a stationary bottom of the reaction chamber similar to the corresponding design of the device shown in FIG. 1. In this case, the tubular core structure 34 is preferably not separated from the inner cylinder 3 but is formed by having the inner cylinder 3 extend down to the bottom of the reaction chamber, the perforations 35 then being provided in the downwardly extended inner cylinder 3. In cases where the nozzles of the two nozzle groups 36 and 37 as well as the openings 35 are not part of the rotating disc, they must be so designed that all inflowing media have the same angular velocity. Consequently, the guide vanes of the nozzles must be curved as shown in FIG. 5, and the openings 35 must be directed tangentially.

The embodiments of the devices shown on the drawings may further be so designed that the media flowing in the reaction chamber at the same angular velocities have mutually opposite axial velocities. This requires that the two ring-shaped nozzles groups be located at respective opposite axial ends of the reaction chamber. In consequence, the corresponding exit channels must be located at opposite ends. If in this case the two media are given the same angular velocities by mounting the two nozzle groups on respective rotating discs, then the two discs are preferably mechanically connected with each other by a central longitudinal shaft in the interior of the reaction chamber.

For further explanation, two examples of the method according to the invention will be described relating to the gasifying of pulverized coal and the gasifying of a mineral oil respectively. Both exemplified methods were carried out in a device substantially identical with the one illustrated in FIGS. 1 to 6 and described above.

*Example 1*

The burner 13 was supplied through nozzle 20 with coal dust, and through pipe 42 with combustion air previously heated in a heat exchanged to about 750° C. The quantity of combustion gas produced in the vortex chamber 13 was approximately 5700 Nm.$^3$/h. The gas temperature was at about 1500° C. The combustion gases were supplied through the outer nozzle group 5 into the reaction chamber 1.

The nozzle group 4 was supplied through conduit 8 and inner cylinder 3 with steam in a quantity of 1050 kg./h. at a temperature of 600° C. to which were admixed approximately 870 kg. coal dust per hour. The coal from which the dust was prepared had an ash content of 9.5% and 89% carbon.

The height of the reaction chamber 1 was 3 m., its inner diameter was 1.5 m., and the outer diameter of the inner cylinder 3 was 0.6 m. The combustion gases and the mixture of steam and coal dust traveled in the reaction chamber helically upward at an axial velocity of 5 m./second and an angular velocity of about 2.38°/second. The hot combustion gases, passing through the reaction chamber, continuously radiated heat inwardly. They also heated the wall of vessel 2 to a temperature of approximately 1500° C., so that the vessel wall likewise radiated heat inwardly. This produced a water-gas reaction of the steam and the coal dust, and accordingly the gas drawn from ring space 28 consisted of carbon monoxide and hydrogen with slight admixtures of carbon-dioxide, water and nitrogen. The quantity of output gas thus obtained was 2630 Nm.$^3$/h. and its temperature was about 1000° C. The combustion gases were discharged from the reaction chamber through the exit space 25.

Based upon the above-described example, it was calculated that in order to produce the water-gas reaction and to heat the evolving useful gas to about 1000° C., about $2 \cdot 10^6$ kcal./h. had to be radiated in the reaction chamber from the combustion gases to the mixture of steam and coal dust.

*Example 2*

The second example was carried out under the same conditions as described above with reference to Example 1. However, the inner nozzle group 4 was supplied with only 876 kg. steam per hour at a temperature of 600° C. A mineral oil was injected through the nozzle 9 into the steam. The oil had a carbon content of 86% by weight and a hydrogen content of 11%. The caloric value of the oil was 9500 kcal./kg., and injected quantity was 860 kg./h. A gas was withdrawn from the ring space 27 composed of carbon monoxide and hydrogen with slight admixtures of carbon dioxide, steam and nitrogen. The quantity of the useful gas thus obtained was 3000 Nm.$^3$/h. at a temperature of about 1000° C.

If, as in the examples, the medium flowing along the inner vortex contains the substances to be gasified or cracked, a portion of these substances is flug by centrifugal force outwardly into the heating gas and, if the heating gas possesses some excess of oxygen, is burned within the heating gas. This results in a further increase in temperature.

I claim:

1. The method of producing fuel gas by gasifying a carbon-containing fuel substance, which comprises passing separately and coaxially a heating gas and a carrier gas through an annular processing chamber of circular cross section so as to transfer heat from said heating gas to said carrier gas, the carrier gas containing the substance to be processed, injecting said two gases separately into said chamber so as to impart to said two gases respective rotary movements of the same direction and substantially the same angular velocity and forming thereby two adjacent, annular, coaxial, helical streams of gas having different radii and without any substantial mixing of the two gas streams, one stream being substantially within and adjacent to the other and in direct heat exchanging relation thereto, whereby said carbon-containing substance in said carrier gas becomes thermally cracked and converted into a combustible fuel gas, and then separately withdrawing from said chamber said combustible fuel gas thus formed and said heating gas.

2. The method of producing a combustible gas by thermally processing a carbon-containing substance which is crackable to form a combustible gas and which is dispersed in a carrier gas, by heat exchange with a heating gas, which comprises injecting said two gases separately into a chamber so as to form two adjacent, annular, coaxial, helical currents of gas having different radii and without any substantial mixing of the two gas currents, said helical currents progressing in an axial direction, said substance-containing carrier gas and said heating gas respectively being in direct heat-exchanging relation to each other so as to transfer heat from said heating gas to said carrier gas, one of said currents being within the other, and said injecting step imparting to said two currents substantially the same angular velocity, whereby said carbon-containing substance in said carrier gas becomes thermally cracked and converted into a combustible fuel gas, and then separately withdrawing from said chamber said combustible fuel gas thus formed and said heating gas.

3. The method of producing a combustible gas by gasifying a carbon-containing substance which is crackable to form a combustible gas and which is dispersed in a carrier gas, by heat exchange with a heating gas within a processing vessel, which comprises separately injecting and passing axially through said vessel from one axial end of said vessel two circulating currents of said substance-containing carrier gas and said heating gas respectively in direct heat-exchanging relation to each other to form two adjacent, annular, coaxial, helical currents of gas having different radii and without any substantial mixing of the two gas currents, one of said currents being within the other and both having the same direction of axial progression, maintaining both currents at substantially the same angular velocity so as to transfer heat from said heating gas to said carrier gas and so as to thermally convert said carbon-containing substance in said carrier gas into a combustible fuel gas, and separately passing said two currents out of said vessel at the other axial end of the latter to separate said heating gas from said carrier and fuel gas.

4. The method according to claim 1, comprising the step of producing combustion gases by burning in a vortex combustion chamber and passing said combustion gases to said processing chamber to serve as said heating gas.

5. The method of producing a combustible gas by gasifying a carbon-containing substance which is crackable to form a combustible gas and which is dispersed in a carrier gas, by heat exchange with a heating gas within an annular processing chamber, which comprises separately injecting and passing two adjacent, annular, coaxial, helical currents of said substance-containing carrier gas and said heating gas respectively in direct heat-exchanging relation to each other from respective concentric groups of inlet nozzles axially through said chamber from one axial end thereof and at substantially the same respective angular velocities so as to transfer heat from said heating gas to said carrier gas and so as to thermally convert said carbon-containing substance in said carrier gas into a combustible fuel gas, said currents having different radii, whereby there is no substantial mixing of said currents, the latter following respective helical paths, and separately passing said two currents out of the vessel at the opposite end of the chamber to separate said heating gas from said carrier and fuel gas.

6. The method of producing a combustible gas by thermally processing a carbon-containing substance which is crackable to form a combustible gas and which is dispersed in a carrier gas, by heat exchange with a heating gas within an annular space formed between a cylindrical vessel and a central core, which comprises separately injecting and passing two circulating adjacent, annular, coaxial, helical currents of said substance-containing carrier gas and said heating gas respectively in direct heat-exchanging relation to each other through said annular space in the axial direction thereof without any substantial mixing of said two currents so as to transfer heat from said heating gas to said carrier gas and so as to thermally convert said carbon-containing substance in said carrier gas into a combustible fuel gas, one of said currents being within the other and both having substantially the same angular velocity, and separately passing said two currents out of said vessel to separate said heating gas from said carrier and fuel gas.

References Cited in the file of this patent

UNITED STATES PATENTS

| | | |
|---|---|---|
| 1,055,334 | Laird | Mar. 11, 1913 |
| 1,437,587 | Eddy | Dec. 5, 1922 |

(Other references on following page)

UNITED STATES PATENTS

| | | |
|---|---|---|
| 1,505,809 | Schmidt | Aug. 19, 1924 |
| 1,892,559 | Hillhouse | Dec. 27, 1932 |
| 2,546,042 | Oberfell et al. | Mar. 20, 1951 |
| 2,599,981 | Ekholm | June 10, 1952 |
| 2,865,820 | Totzek et al. | Dec. 23, 1958 |

OTHER REFERENCES

German printed application of Stroehlen, 1,038,227, Sept. 4, 1958.